May 14, 1968     A. WINKLER ET AL     3,383,068
CAMERA WITH AUTOMATIC FILM THREADING MEANS
Filed May 4, 1966     3 Sheets-Sheet 1

INVENTORS:
ALFRED WINKLER
HEINZ ERNST

INVENTORS:
ALFRED WINKLER
HEINZ ERNST

United States Patent Office 3,383,068
Patented May 14, 1968

3,383,068
CAMERA WITH AUTOMATIC FILM
THREADING MEANS
Alfred Winkler and Heinz Ernst, Munich, Germany, assignors to Agfa-Gevaert Aktiengesellschaft, Leverkusen, Germany
Filed May 4, 1966, Ser. No. 547,568
Claims priority, application Germany, May 7, 1965, A 49,148
21 Claims. (Cl. 242—71.1)

The present invention relates to photographic cameras in general, and more particularly to improvements in cameras with automatic film threading means.

It is already known to provide a camera with a film transporting mechanism which cooperates with a so-called auto-threader serving to automatically couple the leading end of roll film to the take-up spool. As a rule, the camera is supplied with a special take-up spool which is formed with teeth serving to enter the perforations of roll film and to coil the film in response to rotation of the spool. A serious drawback of presently known self-threading take-up spools and auto-threaders is that they are either too complicated, too bulky and/or insufficiently reliable so that the user is not absolutely sure that the leading end of the film is actually attached to the take-up spool.

Accordingly, it is an important object of the present invention to provide a photographic camera, particularly a still camera, with a novel and improved film threading unit and to provide a novel take-up spool which can cooperate with such film threading unit to insure proper retention of the leading end of roll film in response to manipulation of the film transporting mechanism.

Another object of the invention is to provide the novel film threading unit with very simple guide members which can automatically direct the leading end of the film into proper engagement with the take-up spool and which can also serve to actually clamp the leading end to the spool.

A further object of the instant invention is to construct the guide members in such a way that one thereof can automatically retain the take-up spool in optimum position for engagement with the leading end of the film.

An additional object of the invention is to provide a film threading unit which occupies very little room, which can be readily installed in presently known cameras, and which requires no attention on the part of the operator.

A concomitant object of the invention is to provide a novel take-up spool for roll film which is constructed and assembled in such a way that it automatically clamps and releases the leading end of the film, depending upon the direction in which the film is being advanced by the film transporting mechanism.

An additional object of the invention is to provide a take-up spool which automatically tensions the film which is convoluted therearound and which can be automatically arrested in optimum position for reengagement with the leading end of a fresh film in response to removal of a roll of exposed film from the camera.

Still another object of the invention is to provide a film threading unit whose guide members may be installed in part on the take-up spool and in part in the housing of the camera.

A further object of the invention is to provide a camera wherein the leading end of the film is automatically and reliably clamped to the take-up spool regardless of the distribution of perforations along one or both longitudinally extending edges of the film and wherein such clamping action can be achieved without relying on teeth which must enter the perforations as in presently known auto-threaders.

Another object of the invention is to provide a very compact film threading unit the major part of which is accommodated in and/or supported by the take-up spool.

Briefly stated, one feature of our present invention resides in the provision of a photographic camera, particularly a still camera, which comprises a camera housing defining a chamber and including a platform along which the leading end of a supply of roll film can advance from a supply spool toward the chamber, a transporting mechanism for advancing the film at the will of the operator whereby the leading end of a freshly inserted supply of roll film advances along the platform and into the aforementioned chamber, a take-up spool rotatably mounted in the chamber and coupled with the transporting mechanism so that it tends to rotate and to wind the film around its core in response to manipulation of the transporting mechanism, the core of the take-up spool being hollow and having an inlet preferably in the form of an axially parallel slot through which the leading end of the film enters in response to advance of the film into the chamber whereby the leading end travels along the internal surface of the core, and specially configurated and mounted guide means for the film. Such guide means comprises a guide member which is rotatable with the take-up spool and is preferably rockable about a pivot axis parallel to the core of the take-up spool between a first position in which a portion of this guide member extends between the inlet of the take-up spool and the platform to direct the leading end of the film into the core and a second position in which the guide member automatically clamps the film against the take-up spool so that, in response to rotation of the take-up spool, the film is automatically convoluted around the core and around the guide member. In accordance with an advantageous feature of our invention, the guide member is movable to second position by the leading end of the film after the leading end enters the core of the take-up spool. Such movement of the guide member to second position can take place in response to direct engagement by the leading end or indirectly; in the latter case, the core of the take-up spool supports a rotary toothed member a portion of which extends into the pathway of the leading end in the core and whose teeth mesh with teeth provided on the guide member.

The novel features which are considered as characteristic of the invention are set forth in particular in the appended claims. The improved camera itself, however, both as to its construction and the mode of manipulating the same, together with additional features and advantages thereof, will be best understood upon perusal of the following detailed description of certain specific embodiments with reference to the accompanying drawings, in which:

Figure 1:
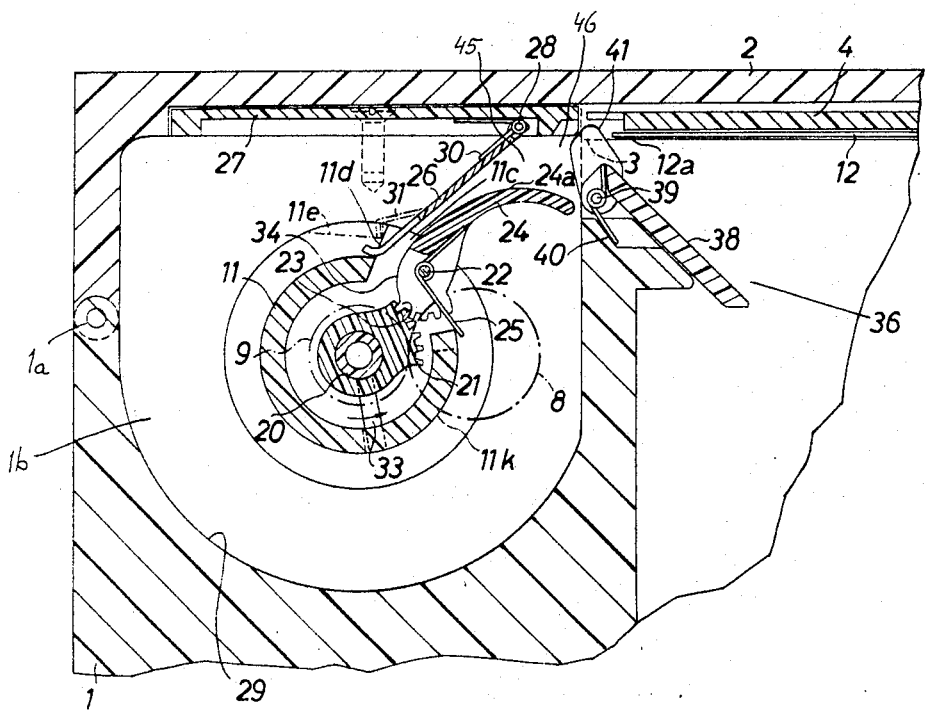
FIG. 1 is an enlarged fragmentary horizontal section through a still camera which embodies our invention, the leading end of the film being shown in a position it assumes just before it is automatically anchored in the take-up spool.
Figure 3:
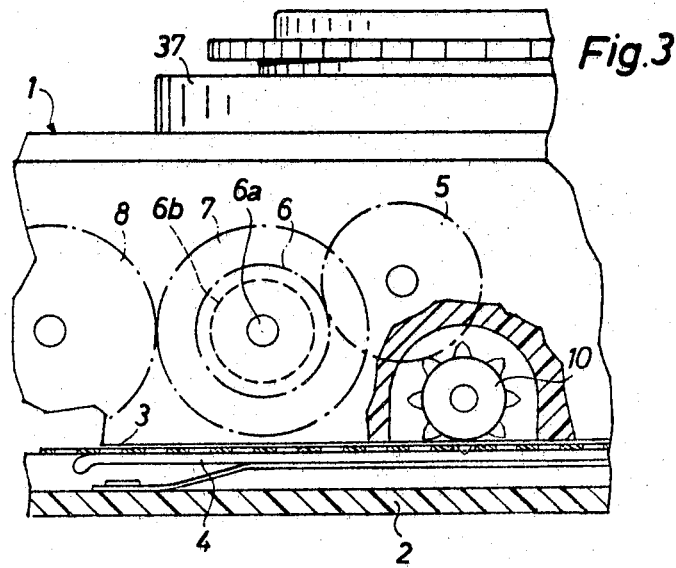
FIG. 3 is a fragmentary in part top plan and in part horizontal sectional view of the camera and illustrates certain component parts of the film transporting mechanism.

Referring to the drawings in detail, and first to FIGS. 1 and 3, there is shown a still camera comprising a housing 1 provided with a hinge 1a for a pivotable rear wall 2. The housing 1 is further provided with a film platform 3 which is located between the rear wall 2 and an objective 37. The rear wall 2 carries a spring-biased pressing plate 4 which is located behind the film platform 3 and urges the film 12 against the platform when the rear wall is moved to the closed position shown in FIGS. 1 and 3 whereby a film frame lies flat in the focal plane. The film transporting mechanism comprises a gear train 5 to 9 and one or more sprockets 10. The gear 5 can be rotated by a suitable transporting lever, not shown, and drives the sprocket or sprockets 10 whose teeth enter the customary perforations of the film 12 to advance the latter along the film platform 3 and in a direction toward a chamber 29 provided in the housing 1 and arranged to accommodate a specially constructed removable take-up reel or spool 11. The gears 6 and 7 of the film transporting mechanism are mounted on a common shaft 6a and are coupled to each other by a suitable friction clutch 6b so that, when the aforementioned transporting lever rotates the gear 5, the gear 6 (which meshes with the gear 5) rotates at the same peripheral speed but the gear 6 can slip with reference to the gears 7, 8 and 9. The gear 9 is operatively connected with the spool 11 and the ratio of the transmission including the gears 6–9 is such that the spool 11 tends to rotate at a speed exceeding the speed of the sprocket 10 whereby the film 12 is tensioned between the sprocket 10 and the spool 11 to make sure that its convolutions are tightly packed around the hollow core 11A of the spool. The gear 9 may be positively or separably connected with the spool 11. The aforementioned friction clutch 6b compensates for the difference between rotational speeds of the sprocket 10 and spool 11.

Figure 2:
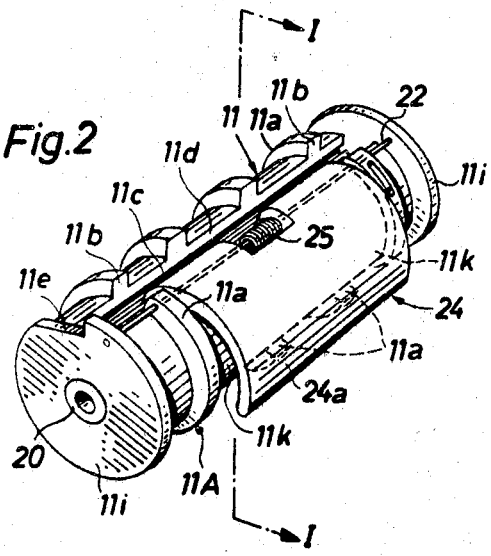
FIG. 2 is a perspective view of the take-up spool.

The spool 11 is shown in FIGS. 1 and 2 and comprises the aforementioned tubular core 11A which is provided with at least two axially spaced flanges 11a each located in line with one row of perforations of the film 12. Each of the flanges 11a is formed with a tooth 11b having a radially extending flank and adapted to enter one perforation of the respective flow of perforations. Adjacent to the teeth 11b, there is provided in the core 11A an axially parallel inlet in the form of a slot 11c through which the leading end 12a of the film 12 can enter the interior of the spool 11. The length of the slot 11c at least equals the width of the film 12. The core 11A accommodates a tubular shaft 20 which carries the hub of a rotatable toothed member here shown as a gear segment 21 meshing with a similar gear segment 23 constituting one arm of a two-armed guide lever 24 which is rockable on an elongated pivot pin 22 carried by the spool 11. The pin 22 is parallel with the shaft 20 and the lever 24 is permanently biased by a torsion spring 25 which tends to rotate this lever in a counterclockwise direction as the parts appear in FIGS. 1 and 2. When the lever 24 is free to follow the bias of the spring 25, its arcuate arm 24a is adjacent to one end of the film platform 3 and serves as a guide for the front side of the leading end 12a. The film 12 is assumed to be stored on a supply reel or spool (not shown) which is located to the right of the film platform 3, as viewed in FIG. 1.

The housing 1 supports a second guide member 26 which cooperates with the lever 24 to define therewith an inclined film channel 45 extending from the film platform 3 toward the inlet 11c of the spool 11. The guide member 26 resembles a panel which is mounted on a pivot 28 carried by a cover plate 27 which is secured to the housing 1 and closes off the rear side of the chamber 29. A torsion spring 30 is coiled around the pivot 28 and biases the guide member 26 in a direction toward the spool 11. It will be noted that the cover plate 27 is located between the rear wall 2 and the chamber 29. This cover plate 27 defines with the adjoining end of the film platform 3 a relatively narrow gap 46 through which the leading end 12a of the film 12 can advance into the channel 45 between the guide members 24 and 26. When the film 12 is not as yet connected with the spool 11, a hooked projecting portion or nose 31 of the guide member 26 extends into a suitable recess 11e of the spool 11 to hold the latter against rotation in a sense to wind the film there-around. In other words, the projection 31 then opposes the action of the gear 5 which, when rotated by the transporting lever, tends to rotate the spool 11 in a counter-clockwise direction, as viewed in FIG. 1. At the same time, the projection 31 holds the spool 11 in an optimum angular position for automatic threading of the film 12, i.e., this projection holds the inlet 11c in registry with the channel 45.

In automatically attaching the leading end 12a of the film 12 to the take-up spool 11, the operator will proceed as follows: The aforementioned supply spool is inserted into the corresponding chamber of the housing 1 and the exposed length of the film 12 is placed against the film platform 3 so that the leading end 12a of the film is more or less adjacent to the cover plate 27. The rear wall 2 is then swung back to closed position so that the pressing plate 4 begins to bear against the film 12 and the operator thereupon manipulates the aforementioned transporting lever to rotate the gear 5 and to thereby also rotate the sprocket or sprockets 10 and spool 11. The spool 11 comes to a halt as soon as its recess 11e receives the projection 31 of the guide member 26. The sprocket 10 continues to rotate and advances the film 12 along the film platform 3 whereby the leading end 12a passes through the gap 46 between the platform 3 and cover member 27 and enters the channel 45 between the guide members 24, 26. The projection 31 of the guide member 26 maintains the spool in such angular position that the inlet 11c of the core 11A constitutes an extension of the channel 45 so that the leading end 12a automatically enters the inlet and advances around the shaft 20 and along the internal surface of the core to ultimately engage a suitable motion transmitting portion or extension 33 of the gear segment 21. The extension 33 projects into the interior of the spool 11, i.e., into the pathway of the leading end 12a, whereby the latter turns the gear segment 21 in a counterclockwise direction, as viewed in FIG. 1, and the segment 21 rotates the guide lever 24 in a clockwise direction because the lever 24 is integral or rigid with the gear segment 23 which meshes with the segment 21. The guide lever 24 has a clamping portion 34 which begins to bear against that portion of the film 12 which is located in the channel 45 and presses together with the gear segment of the lever 24 the film against the guide member 26 as well as against the edge face 11d along the slot 11c. In other words, the film is now clamped to the spool 11 and cannot move lengthwise without effecting an angular displacement of this spool. As the operator continues to rotate the gear 5 and hence also the sprocket or sprockets 10, the latter will supply additional film into the channel 45 whereby such film piles up upstream of the clamping portion 34 and ultimately pivots the guide member 26 in a clockwise direction, as viewed in FIG. 1, so that the projection 31 is expelled from the recess 11e and the spool 11 is free to rotate in response to torque transmitted by the gear 9. If the operator continues to rotate the gear 5, the spool 11 will also rotate and the film 12 will be convoluted around the flanges 11a each of which is formed with a recess or cutoff 11k (see FIG. 2) adapted to accommodate the guide lever 24. The outer surface of the lever 24 has the same curvature as the core 11A so that, in its clamping or retaining position the lever 24 fills the recesses 11k and forms an extension of the flanges 11a. In response to further rotation of the spool 11, the film 12 is convoluted around the flanges 11a and also around the lever 24 and forms a series of tightly packed convolutions because the spool 11 tends to rotate at a speed which exceeds the speed of the sprocket 10, the aforementioned friction clutch 6b taking care of necessary slippage to avoid tearing of the film. As the number of convolutions on the spool 11 increases, the outermost convolution pivots the guide member 26 further away from the spool whereby the spring 30 stores energy. The leading end 12a of the film 12 remains clamped between the edge face 11d and the guide lever 24.

When the fully exposed film 12 is being rewound onto the supply spool, the clamping action upon the leading end 12a is terminated only when the leading end ceases to bear against the extension 33 of the gear segment 21 so that the spring 25 is free to dissipate its energy and to return the guide lever 24 to the position shown in FIG. 1. The spring 30 is then also free to dissipate energy and returns the projection 31 into the recess 11e to arrest the spool 11 in an angular position in which the inlet 11c registers with the channel 45.

In order to prevent the leading end 12a of the film 12 from penetrating into the space 36 surrounded by the film platform 3 and located behind the objective 37, the camera is preferrably provided with an auxiliary guide member 38 which resembles a plate and is pivotable on a pin 39 carried by the housing 1 behind the left-hand end of the platform 3 adjacent to the gap 46 between the platform 3 and the cover member 27. The auxiliary guide member 38 is biased by a torsion spring 40 which tends to rotate it in a clockwise direction, as viewed in FIG. 1. The guide member 38 is further provided with a projecting portion here shown as a trip or cam 41 which extends into the pathway of film 12 along the platform 3. If, during automatic threading of the film 12, the leading end 12a tends to advance into the space 36 behind the objective 37, such leading end meets the inclined surface of the auxiliary guide member 38 and is guided toward the gap 46 between the platform 3 and cover member 27. The automatic threading operation then proceeds in the aforedescribed manner and the leading end 12a is ultimately clamped between the guide lever 24 and edge face 11d of the take-up spool 11. Once the film 12 is subjected to requisite tension, it bears against the trip 41 whereby the latter rocks the auxiliary guide member 38 in a counterclockwise direction, as viewed in FIG. 1, and moves the latter into a plane which is substantially parallel to the planes of the pressing plate 4 and film platform 3.

The improved camera is susceptible of many modifications without departing from the spirit of the invention. For example, the flanges 11a and teeth 11b may be dispensed with if the wall thickness of the core 11A suffices to present a sufficient clamping face for engagement of the film 12. Furthermore, the take-up spool 11 may be provided with one or two end flanges 11i one of which defines the recess 11e and this spool may but need not be accommodated in a suitable cartridge, not shown. Also, the projection 31 of the guide member 26 need not enter a specially provided recess 11e but may be positioned to enter the slot 11c so that the recess 11e may be dispensed with. Alternatively, the recess 11e may be replaced by a suitable groove or depression which is dimensioned in such a way that it can receive one or more projections 31.

If the spool 11 is removable from the housing 1, the rear wall 2 is preferably integral or detachably connected with an end wall 1b of the housing 1 so that such end wall will move to open position in response to opening of the rear wall 2. The spool 11 is then withdrawable in the axial direction of its core 11A. If the spool 11 is accommodated in a cartridge, the guide lever 24 is preferably mounted externally on the cartridge and the gear segments 21, 23 as well as the clamping portion 34 are then provided on the spool in the interior of the cartridge. The guide member 26 can remain on the cover member 27.

Figure 4:
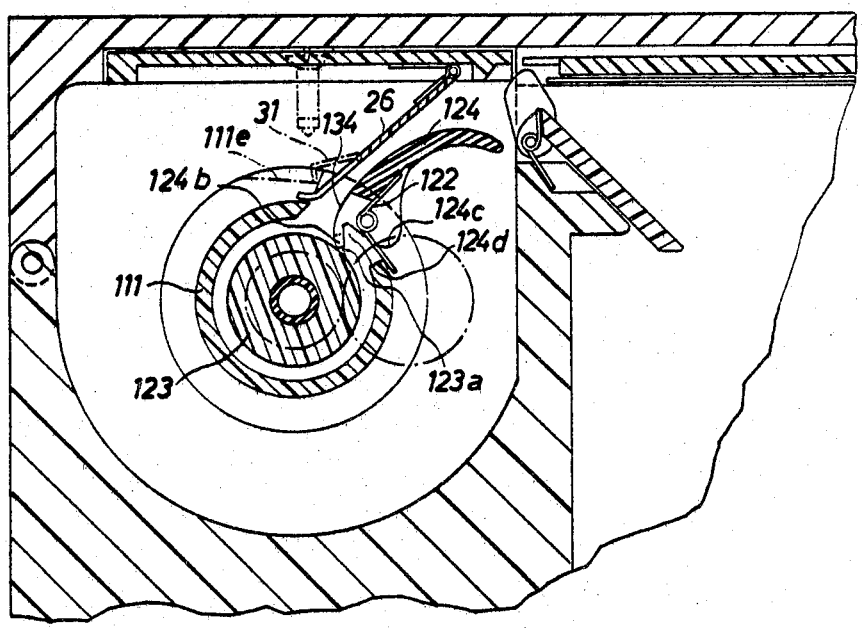
FIG. 4 is an enlarged fragmentary horizontal section through a modified camera.

It is further clear that the gear segment 21 may be omitted if the leading end 12a of the film 12 can directly engage the guide lever to rock the latter from the first position shown in FIG. 1 to a second or clamping position. This modification is shown in FIG. 4. The spool 111 has a slotted cylindrical mantle and a cylindrical core 123. A flange of the spool 111 is provided with a recess 111e for the projecting portion 31 of the guide member 26. The guide lever 124 is biased by a spring 122 and has a recess 124d disposed between two projections 124b, 124c. The projection 124b bears against a cam 123a of the core 123. The clamping portion of the lever 124 is shown at 134. When the leading end of the film enters the space between the core 123 and the mantle of the spool 111, it advances toward and enters the recess 124d to rock the lever 124 in a clockwise direction. The projection 124c moves toward the core 123 and clamps a portion of the film thereagainst. The clamping portion 134 moves toward and presses a portion of the film against the guide member 26 so that the latter ultimately withdraws the projecting portion 31 from the recess 111e. It will be seen that the operation of this modified spool 111 is clearly analogous to that of the spool 11.

As stated before, the spool 11 may be produced without flanges 11a; however, if such flanges are omitted, the core 11A should preferably be provided with a cutout or recess corresponding to the cutoff 11k of FIG. 2 to accommodate the guide lever 24 when the latter has been moved to clamping position. This insures highly satisfactory winding of film 12 around the core 11A and lever 24. It is also possible to position the guide lever 24 in such a way that its clamping portion 34 or another portion of this lever serves as a means for dislodging the projection 31 from the recess 11e when the leading end 12a of the film is properly anchored in the spool 11, i.e., a projection or the like on the lever 24 can automatically pivot the guide member 26 as soon as it has been rocked far enough to insure satisfactory clamping action upon the leading end 12a.

The provision of the guide member 38 by itself forms no part of our present invention. This guide member is disclosed and claimed in the copending application Ser. No. 550,268, filed May 16, 1966, of Winkler et al., which is assigned to the same assignee.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a photographic camera, a housing defining a chamber and comprising a platform along which the leading end of a supply of roll film can advance toward said chamber; a transporting mechanism for advancing the film; a take-up spool rotatably mounted in said chamber and coupled with said mechanism, said spool having a core provided with an inlet through which the leading end enters in response to advance of film into said chamber; and guide means for the film, said guide means comprising a guide member rotatable with said spool and movable by the leading end, upon passing of such leading end through said inlet, from a first position to a second position in which said guide member engages the film so that, in response to rotation of said spool, the film is automatically convoluted around said core and around said guide member.

2. A structure as set forth in claim 1, wherein said core is hollow and has an internal surface along which the leading end of the film travels upon passing through said inlet.

3. A structure as set forth in claim 2 wherein, in said first position thereof, a portion of said guide member extends between said inlet and said platform to direct the leading end of the film into the inlet of said core.

4. A structure as set forth in claim 2, wherein said guide member comprises a two-armed lever which is pivotably secured to said spool and is rockable between said first and second positions thereof about an axis parallel to said core, one arm of said lever extending into said core in the first position of said guide member and being rockable by the leading end of the film to thereby move the guide member to said second position.

5. A structure as set forth in claim 2, further comprising means for biasing the guide member to said first position.

6. A structure as set forth in claim 2, wherein said guide member is recessed into said core in the second position thereof.

7. A structure as set forth in claim 6, wherein said guide member has a guide surface having the same curvature as the peripheral surface of said core.

8. A structure as set forth in claim 2, wherein said guide member compreses a two-armed lever which is pivotably secured to said spool and is rockable between said first and second positions thereof about an axis parallel with said core, one arm of said lever having teeth extending into said core in the first position of said guide member, said spool further comprising a rotary toothed member meshing with said one arm and having a portion extending into the pathway of the leading end of roll film in said core so that said guide member is moved to second position in response to angular displacement of said toothed member by the leading end of the film in said core.

9. A structure as set forth in claim 8, wherein said portion of said rotary member is an arm which extends substantially radially of said core.

10. A structure as set forth in claim 2, further comprising a cover member supported by said housing and bounding a portion of said chamber, said cover member and said platform defining between themselves a gap through which the leading end of the film can enter said chamber.

11. A structure as set forth in claim 10, wherein said guide means further comprises a second guide member pivotably supported by said cover member and defining with said first named guide member a film channel leading to said inlet when said first named guide member assumes said first position.

12. A structure as set forth in claim 11 further comprising resilient means for biasing said second guide member against said spool.

13. A structure as set forth in claim 12, wherein said spool is provided with a recess and said second guide member comprises a portion which extends into said recess to hold said spool against rotation in response to manipulation of said transporting mechanism prior to clamping of the leading end of roll film against said spool.

14. A structure as set forth in claim 13, wherein said second guide member is disengageable from said spool by roll film which is fed into said chamber subsequent to clamping of said leading end by said first named guide member.

15. A structure as set forth in claim 13, wherein said first named guide member comprises a portion which disengages said second guide member from said spool in response to movement of said first named guide member to second position.

16. A structure as set forth in claim 2, wherein said platform surrounds a space in said housing located ahead of said chamber, as seen in the direction in which the film is advanced toward said spool, said guide means further comprising an auxiliary guide member provided in said space for guiding the leading end of the film toward said chamber.

17. A structure as set forth in claim 16, wherein said auxiliary guide member is pivotable about an axis parallel to said core and further comprising resilient means for biasing said auxilary guide member to a position in which said auxiliary guide member is inclined with reference to the plane of said platform.

18. A structure as set forth in claim 17, wherein said auxiliary guide member comprises a portion extending into the pathway of film along said platform and arranged to rock said auxiliary guide member into substantial parallelism with said platform in response to clamping and subsequent tensioning of the film.

19. A structure as set forth in claim 2, wherein said transporting mechanism comprises a sprocket adjacent to said platform and having teeth arranged to enter the perforations of roll film, a first gear for driving said sprocket at a first speed, a second gear for driving said spool at a speed exceeding said first speed, and a friction clutch between said gears for permitting relative movement between said gears and for automatically tensioning the film when the spool is rotated and collects the film subsequent to clamping of said leading end.

20. A structure as set forth in claim 19, wherein said guide means further comprises a second guide member provided in said chamber and cooperating with said first named guide member to define therewith a channel through which the leading end of the film is guided toward said inlet in response to manipulation of said transporting mechanism, and further comprising means for automatically holding said spool against rotation prior to clamping of said leading end and for thereby holding said spool in an angular position in which said inlet registers with said film channel.

21. A structure as set forth in claim 20, wherein said first named guide member comprises a portion which is adjacent but spaced from said second guide member and extends between said platform and said inlet when the first named guide member assumes said first position.

References Cited

UNITED STATES PATENTS 2,542,186   2/1951   Fulop _____ 242—74.1

OTHER REFERENCES

Bilz: German printed application, 1,011,275, pub. June 27, 1957.

GEORGE F. MAUTZ, *Primary Examiner.*